(12) United States Patent
Brahme (10) Patent No.: US 8,316,121 B2
(45) Date of Patent: Nov. 20, 2012

(54) CLUSTER COMPUTING

(75) Inventor: Dhananjay Brahme, Pune (IN)

(73) Assignee: Computational Research Laboratories Limited, Pune (IN)

( * ) Notice: Subject to any disclaimer, the term of this patent is extended or adjusted under 35 U.S.C. 154(b) by 84 days.

(21) Appl. No.: 13/045,745

(22) Filed: Mar. 11, 2011

(65) Prior Publication Data

US 2011/0161481 A1 Jun. 30, 2011

Related U.S. Application Data

(63) Continuation of application No. PCT/IN2009/000500, filed on Sep. 11, 2009.

(30) Foreign Application Priority Data

Sep. 12, 2008 (IN) .......................... 1948/MUM/2008

(51) Int. Cl.
*G06F 15/173* (2006.01)
(52) U.S. Cl. ....................................... 709/223; 709/227
(58) Field of Classification Search .......... 709/220–224, 709/227–228, 201, 249–252
See application file for complete search history.

(56) References Cited

U.S. PATENT DOCUMENTS

| | | | | |
|---|---|---|---|---|
| 6,449,641 | B1 * | 9/2002 | Moiin et al. ................... | 709/220 |
| 2001/0054124 | A1 * | 12/2001 | Tsuruta et al. ................ | 710/100 |
| 2007/0050485 | A1 * | 3/2007 | Zolfaghari ..................... | 709/220 |
| 2007/0299950 | A1 * | 12/2007 | Kulkarni ........................ | 709/223 |

FOREIGN PATENT DOCUMENTS

WO 97/34239 A1 9/1997

OTHER PUBLICATIONS

Bharadwaj S. Amrutur et al, "A Projective Geometry Architecture for Scientific Computation," AT&T Bell Laboratories, Murray Hill, NJ, 1992.

Behrooz Parhami, "Performance, Algorithmic, and Robustness Attributes of Perfect Difference Networks," IEEE Transactions on Parallel and Distributed Systems, vol. 16, No. 8, Aug. 2005.

James Singer, "A Theorem in Finite Projective Geometry and Some Applications to Number Theory," Transactions of the American Mathematical Society, vol. 43, No. 3, May 1938.

* cited by examiner

*Primary Examiner* — Abdullahi Salad
(74) *Attorney, Agent, or Firm* — Robert Plotkin, P.C.

(57) ABSTRACT

A method for arranging a plurality of nodes in a cluster is disclosed. The invention proposes a scheme for creation of a cluster having optimum number of connections and with a diameter of two, meaning any two nodes are at most two edges away from each other. The present invention uses Singer Difference Set for deriving networks with a smaller number of connections per node for clusters of the same size. Further, the method envisaged by the present invention allows multiple computers to be placed at each node with the computers sharing the network in a non-conflicting manner, resulting in a powerful cluster at reduced cost.

20 Claims, 1 Drawing Sheet

CLUSTER COMPUTING

CROSS-REFERENCE TO RELATED APPLICATIONS

This application is filed pursuant to 35 U.S.C. §120 as a bypass continuation application of PCT application serial number PCT/IN2009/000500, filed on Sep. 11, 2009, which claims priority from Indian patent application serial number 1948/MUM/2008, filed on Sep. 12, 2008.

FIELD OF INVENTION

The present invention relates to the field of parallel processing.

Particularly, the present invention relates to connecting computers forming a cluster, for increased computational capability.

DEFINITIONS OF TERMS USED IN THE SPECIFICATION

Computational Element: A computational element is a simple computer, a parallel computer, or a cluster of computers. It can have zero, one or more disks. It is connected to switches and is capable of sending/receiving or forwarding information to other computational elements and switches.

Memory Element: A memory element is any physical unit capable of storing and retrieving information. Typical memory elements are Random Access Memory (RAM) and Read Only Memory (ROM).

Switch: A switch is a communication unit that can connect to one or more computational elements and or switches. They come in a variety of configurations and characteristics. Some of the configurations are (i) A m×m all connect switch: this switch supports simultaneous communication between m/2 pairs (m is even) computational elements or switches connected to it, (ii) A 1×m switch: this switch connects one computational element or switch to m other computational elements or switches.

Node: A node is a point in a network topology. Two nodes are connected by edges. A node can be (i) a computational element with a switch, or (ii) multiple computational elements connected to a switch, or (iii) a memory element with a switch or (iv) a combination of computational and memory elements with switches. Here, the switch connects a computational element or memory element at one end to other switches according to the network topology.

Edge: Edge is a communication line or a link connecting two or more nodes in a network.

Network: A network is a collection of nodes and edges.

Cluster: A computer cluster is a network with the nodes having computational element and switches linked to each other according to the network topology, working together closely so that they form a single powerful computing resource.

Difference Set: A (N, n, λ) difference set is a subset D={$d_0$, $d_1$, ... $d_n$} of a group G={0, 1, 2, ..., N−1} such that the order of G is N, the size of D is n+1, and every non-zero element of G can be expressed as a difference $d_i - d_j$ (where $d_i \neq d_j$) of elements of D in exactly λ ways. In the specification λ=1 is used, and all the arithmetic is modulo N unless otherwise stated.

Singer Difference Set: A difference set 'D' is termed as a singer difference set if it satisfies the property that (N, n, λ)=(($p^{(r+2)}$−1)/(p−1), ($p^{(r+1)}$−p)/(p−1), ($p^r$−1)/(p−1)).

Modulo Arithmetic: In this specification all the arithmetic is modulo N unless stated otherwise.

BACKGROUND OF THE INVENTION

Connecting computers in a cluster is an important way of increasing the computational power available to solve large problems. An important part of a cluster is the underlying connectivity network. Ideally, an all connect network which allows any combination of computers to talk to each other is required. That is, if 'N' computers are labeled {0, 1, ... N−1}, the connectivity network can support any permutation. Having an all connect network is prohibitively expensive for large N as it will require N*(N−1)/2 connections. Hence, the quest for alternative network connections.

When there are k<N−1 connections per node (N node cluster) it may take several hops to communicate data between nodes that are not directly connected. In this invention, a method to connect nodes such that the distance between any two nodes is at most 2 edges is described using the concept of difference sets to create optimum 2-hop computer networks.

Similarly, creating a parallel shared memory computer is an important way of increasing the computational power. As one increases the number of processors which access a large shared memory the performance improvement is often limited by bandwidth at which the memory can supply data to the multiple processors.

A method for creating a network where the maximum distance between any two nodes is 2 is now described. Consider a cluster of N=13 nodes, where the nodes are numbered {0, 1, ..., 12}. Connect the nodes such that node i is connected to node (i+1) mod N. This creates a cycle of N nodes. Nodes 1 and 12 are 1 hop away and nodes 2 and 11 are 2 hops away. The remaining nodes are more than 2 hops away. Next, add another cycle with a stride of 4. Since N=13 is relatively prime to 4 a full cycle of N nodes is obtained, 4 is selected because 4 and its neighbors 3 and 5 were farther than 2 hops from 0. With this connection the maximum number of nodes that will now be within 2 hops of node 0 are added. The TABLE 1 below lists the nodes that can be reached from node 0 in 1 and 2 hops. The connectivity pattern for all nodes is identical; therefore the various properties that are observed for node 0 are true for all other nodes.

TABLE 1

| Cluster connections with 2 cycles | | | | | | | | | | | | | |
|---|---|---|---|---|---|---|---|---|---|---|---|---|---|
| CYCLE 0 | 0 | 1 | 2 | 3 | 4 | 5 | 6 | 7 | 8 | 9 | 10 | 11 | 12 |
| CYCLE 1 | 0 | 4 | 8 | 12 | 3 | 7 | 11 | 2 | 6 | 10 | 1 | 5 | 9 |

TABLE 2

| | 1 and 2 Hop neighbors of Node 0 | | | |
|---|---|---|---|---|
| 1-HOP NEIGHBORS OF NODE 0 | 1 | 12 | 4 | 9 |
| 2-HOP NEIGHBORS OF NODE 0 | 2/1, 5/1, 10/1 | 11/12, 8/12, 3/12 | 8/4, 3/4, 5/4 | 8/9, 10/9, 5/9 |

The TABLE 2 above lists the four 1-hop and six 2-hop neighbors of Node 0. The intermediate nodes of the 2 hop neighbors are also listed. Thus, to reach node 2 from node 0 a move of distance of 2 on Cycle 0 is to be performed. The intermediate node in this case is 1. The 1 hop neighbors are arrived at by moving a distance of 1 on each of the cycles (Cycle 0 and Cycle 1) in the two directions (Clockwise and Anticlockwise). The 2 hop neighbors are arrived at by moving on Cycle 0 or Cycle 1 or both in either direction for a total distance of 2. However, with these 2 cycles nodes 6 and 7 are still present that are more than 2 hops away from node 0. To achieve the two hop connectivity to these nodes another cycle of stride 6 is added. TABLE 3 below lists the nodes on a cycle of stride 6. Both node 6 and node 7 are 1 hop away from node 0.

TABLE 3

$3^{rd}$ Cycle to ensure 2-Hop connectivity for 13 Node cluster

| CYCLE 2 | 0 | 6 | 12 | 5 | 11 | 4 | 10 | 3 | 9 | 2 | 8 | 1 | 7 |
|---|---|---|---|---|---|---|---|---|---|---|---|---|---|

The above method describes an outline of how to create a 2-hop cluster networks. It is possible to create 2-hop networks using Singer Difference Sets. Particularly, the paper presented by Parhami, B et. al [published in Parallel and Distributed Systems, IEEE Transactions on Volume 16, Issue 8, August 2005 Page(s): 714-724] and the PCT Patent Application 97/34239 uses this method to create computer networks. Singer Difference sets were defined in the previous section. It is also possible to create 2-hop networks using Projective Geometry. Singer described in a paper [published May 1938 in Transactions of the American Mathematical Society, Vol 43, No. 3, pp. 377-385 titled A theorem in Finite Projective Geometry and Some Applications to Number Theory by James Singer] that there exists a 1-1 isomorphism between difference Sets and Projective Geometry points. In 1992, Narendra Karmarkar described in a paper [paper appears in Application Specific Array Processors, 1992. Proceedings of the International Conference on Publication Date: 4-7 Aug. 1992 On page(s): 64-80] that projective geometry points and lines (also planes/hyper planes etc.) can be used to create efficient computer networks.

There are known procedures to compute difference sets for small values of n. The TABLE 4 below reproduces a sample collection of difference sets for n=2, 3, 4, 5, 7, 8, 9, 11 from the paper by James Singer (1938) referred above. The method in this invention is described for Singer Difference set, however it will work for the difference set as defined in the earlier section.

TABLE 4

Sample Difference set D for n = 2, 3, 4, 5, 7, 8, 9, 11

| n | N | Difference Set Elements |   |   |   |   |   |   |   |   |   |
|---|---|---|---|---|---|---|---|---|---|---|---|
| 2 | 7 | 0 | 1 | 3 | | | | | | | |
| 3 | 13 | 0 | 1 | 3 | 9 | | | | | | |
| $2^2$ | 21 | 0 | 1 | 4 | 14 | 16 | | | | | |
| 5 | 31 | 0 | 1 | 3 | 8 | 12 | 18 | | | | |
| 7 | 57 | 0 | 1 | 3 | 13 | 32 | 36 | 43 | 52 | | |
| $2^3$ | 73 | 0 | 1 | 3 | 7 | 15 | 31 | 36 | 54 | 63 | |
| $3^3$ | 91 | 0 | 1 | 3 | 9 | 27 | 49 | 56 | 61 | 77 | 81 |
| 11 | 133 | 0 | 1 | 3 | 12 | 20 | 34 | 38 | 81 | 88 | 94 | 104 | 109 |

A standard method to create a cluster based on Singer difference set is described below. Let $N=n^2+n+1$ be the size of G and n the order of difference set D. Then create a cycle of stride $d_i$ where $d_i \in D$ and $d_i \neq 0$ over nodes in the Group D. Thus for 13 nodes, three cycles of stride 1, 3, and 9 are created. For 31 nodes, five cycles of stride 1, 3, 8, 12 and 18 are created. The TABLE 5 below shows Singer Cycles over 13 nodes.

TABLE 5

Cluster of 13 nodes connected using 3 Singer Cycles

| SINGER CYCLE 0 | 0 | 1 | 2 | 3 | 4 | 5 | 6 | 7 | 8 | 9 | 10 | 11 | 12 |
|---|---|---|---|---|---|---|---|---|---|---|---|---|---|
| SINGER CYCLE 1 | 0 | 3 | 6 | 9 | 12 | 2 | 5 | 8 | 11 | 1 | 4 | 7 | 10 |
| SINGER CYCLE 2 | 0 | 9 | 5 | 1 | 10 | 6 | 2 | 11 | 7 | 3 | 12 | 8 | 4 |

In one scheme (Parhami 95) each node represents a computer with a switch. The 13 nodes are connected with 3 cycles as shown in TABLE 5. This results in each node having 6 connections (2 per cycle). A node k is connected to node $k+d_i$ and $k+(N-d_i)$ where $d_i \in D$ and $d_i \neq 0$. Thus, the degree of connections is 2*n. In another scheme (Parhami 95) uses a bipartite graph to model the connections. The computer is represented by a node and a switch by another node. There are N computer nodes and N switch nodes. Computer k is connected to switch k. Switch k connects to computers $k+d_i$ where $d_i \in D$ and $d_i \neq 0$. This results in the switch k having n connections (corresponding to $k+d_i \in D$ and $d_i \neq 0$) plus a connection to its computer and the computer having n connections (corresponding to $k+N-d_i \in D$ and $d_i \neq 0$). Thus, a single connection to 2*n nodes is split into 2 connections to n nodes of the bipartite graph. Thus, the total connections of the computer and switch module is still 2*n. This scheme is equivalent to the following scheme. Let there be a computer at each node k, $0 \leq k \leq N-1$. Connect two switches with n external connections (s0 and s1) to each computer node k. Now connect switch s0 at node k to switch s1 at $k+d_i \in D$ and $d_i \neq 0$. Thus, the degree of the switch can be reduced from 2*n to n, but the two switches (s0 and s1) of degree n will be needed. However, the fundamental problem is the lack of symmetry when using Difference Sets directly to create computer Networks.

A different scheme is proposed by Narendra Karmarkar in which there are N processors and N memories. Processor i connects to memory $i+d_i$ where $d_i$ is an element in the difference set. This means processor i connects to memories in column i+1. Referring to TABLE 5 there is processor 0 which connects to memories 1, 3, 9. In addition, processor 12, 10, 4 connects to memory 0. If there is an architecture where processors and memories are different units then a cluster can be built such that p connections are needed from the memory or processor units. However, in practice processor and memories are present in the same unit. Thus, if processor 0 and memory 0 represent the same node, then the node 0 is connected to 1, 3, 9 because computer 0 needs to connect to memories 1, 3, and 9. Similarly node 0 is connected to 12, 10, 4 because computer 12, 10, and 4 needs to connect to memory 0. Thus, this scheme will also results in 2*3=6 connections per node.

Thus, it is seen that because the method and structure disclosed in the prior art is not symmetric the degree of connections per node becomes 2*n. Therefore, there is a need for a cluster network where the network is symmetric and there are reduced numbers of connections required for the network. In addition, there is a need for a scalable clustered network which is cost-effective and ensures conflict-free communication between the nodes of the cluster.

OBJECT OF THE INVENTION

It is an object of the present invention to provide a cost effective clustered computer network.

Another object of the present invention is to provide a cluster of computers which have increased computational power.

Still one more object of the present invention is to provide a non-conflict data access to a plurality of nodes in a cluster computer network.

Further, another object of the present invention is to reduce the number of connections required for the network.

SUMMARY OF THE INVENTION

The present invention, envisages a method for arranging a plurality of nodes in a cluster, said method comprising the following steps:

quantifying the number of nodes in the cluster 'N' by computing the summation of N using the formula $N=n^2+n+1$, where $n=p^r$ and p is a prime number and r is a positive integer other than zero;

assigning sequentially unique positive integers to each of said nodes of said cluster 'N' between 0, 1, ... N−1;

selecting a Singer Difference set 'D' comprising n+1 elements forming the set $D=\{d_o, d_1, \ldots, d_k, \ldots, d_n\}$ where k is a positive integer having values from 0, 1, ... n+1; and the number $d_k$ are one of the above mentioned positive integers between 0 to N−1, and connecting each node i of said cluster to at most n+1 other nodes satisfying the formula $j=(C-i+d_k) \mod N$ where $d_k$ is an element of the said Singer difference set and i, j are positive integers numbers which can have values in the range of 0, 1, 2, ..., N−1 and C is a fixed constant for a particular network and has values in the range of 0, 1, 2, ..., N−1.

Typically, the connections between the nodes of the cluster are symmetrically connected and maintaining maximum number of edges between any two nodes as 2.

Particularly, the step of connecting said node comprises detecting R reflection nodes, where $R=\{r_0, r_1, \ldots r_n\}$ such that node i is a reflection node if there exists one difference element $d_j$ from the Singer difference set, such that the formula $C-i+d_j=i$ is satisfied and yields a self connection.

Typically, the step of connecting the nodes includes the step of checking if n+1 is even and further includes the step of selecting disjoint (n+1)/2 pairs of nodes from the set R and connecting them to create (n+1)/2 cycles in said cluster.

Typically, the step of connecting the nodes includes the step of checking if n+1 is odd and further includes the step of selecting n/2 pairs of nodes from the set R and connecting them to create n/2 cycles in said cluster.

Typically, the step of connecting all the nodes $r_j$ from set R creates n*(n+1)/2 cycles in said cluster.

Particularly, said method comprises the step of transferring data from one node to all other nodes by performing simultaneous exchanges corresponding to edges of colors k, (k+1) mod(n+1), ..., (k+n+1)mod(n+1) where k is a number in the range 0, 1, 2, ..., n wherein said method uses the permutations of cycles created for transferring data simultaneously between nodes.

Typically, said method comprises the step of connecting the nodes using an 1×(n+1) all connect bidirectional switch to allow two hop connections to directly connect two nodes and perform data transfer using only the intermediate switch.

Typically, said method comprises the step of communicating data simultaneously between node i and node i+d where d=1, 2, ..., N−1.

Particularly, said method comprises the step of sequencing communication when there are n+1 computers such that each of the n+1 computers at every node use a different link resulting in an optimum utilization of the network and an increase in throughput of the network.

Typically, said method comprises steps of populating m computers at each node and further using an m+n+1 all connect switch to create a cluster, where m>1.

In accordance with the present invention, there is provided a method for arranging a plurality of nodes in a cluster. The method in accordance with the present invention includes the following steps:

quantifying the number of nodes in the cluster 'N' by computing the summation of N using the formula $N=n^2+n+1$, where $n=p^r$ and p is a prime number and r is a positive integer other than zero;

assigning sequentially unique positive integers to each of said nodes of said cluster 'N' between 0, 1, ... N−1;

selecting a Singer Difference set 'D' comprising n+1 elements forming the set $D=\{d_o, d_1, \ldots, d_k, \ldots, d_n\}$ where k is a positive integer having values from 0, 1, ... n+1; and the number $d_k$ are one of the above mentioned positive integers between 0 to N−1;

connecting each node i of said cluster to at most n+1 other nodes satisfying the formula $j=(C-i+d_k) \mod N$ where $d_k$ is an element of the said Singer difference set and i, j are positive integers numbers which can have values in the range of 0, 1, 2, ..., N−1 and C is a fixed constant for a particular network and has values in the range of 0, 1, 2, ..., N−1; and populating m computers at each node and further using an m+n+1 all connect switch to create a cluster, where m>1.

Typically, the m computers are further connected by a separate m×m all-connect switch.

Typically, the m computers are further connected in a fat tree network.

Typically, the m computers are further connected in a ring network.

Typically, the m computers are further connected in an all-connect network.

Preferably, at least one node has an additional external access device which can be connected through an (m+1) all connect switch. Typically, the additional external access device is a file server.

Preferably, at least one node has an additional external communicating switch which can be connected through an (m+1) all connect switch.

In accordance with the invention, the step of connecting nodes comprising processors and memories includes the steps of:

connecting N processor nodes between 0, 1, ..., N−1 and N memory nodes between 0, 1, ..., N−1 to an 1×(n+1) switch; and connecting processor i to memory j where $j=C-i+d_k$ where i, j is in the range of $0, 1, \ldots, N-1$, and C is constant for the network in the range $0, 1, \ldots, N-1$ and $d_k$ is difference set element for difference Set $D=\{d_0, d_1, \ldots, d_k, \ldots d_n\}$ for the Group $G=\{0, 1, \ldots, N-1\}$.

Typically, the step of connecting nodes includes the step of connecting m computers to an m×(n+1) switch and the m memories to an m×(n+1) switch.

Typically, the transferring of data takes place by connecting m computers at node i to m memories at node j where $j=C-i+d_k$ where i,j is in the range of $0, 1, \ldots, N-1$, C is constant for the network in the range $0, 1, \ldots, N-1$, $d_k$ is difference set element for difference Set $D=\{d_0, d_1, \ldots, d_k, \ldots, d_n\}$ for the Group $G=\{0, 1, \ldots, N-1\}$, and m is in the range of $1, 2, \ldots, n+1$.

The resulting properties of the network are:

The connections are symmetric, i.e., if node i is connected to node j, then the same formula when applied to node j yields a connection to node i.

From any node i, where $i=0, 1, 2, \ldots N-1$, a node j is either directly connected to node i or is connected to an intermediate node k which is connected to node i. Here i, j, and k are numbers in the range $0, 1, 2, \ldots, N-1$. When a node is directly connected to i it is said to be one-hop away. If it is connected through an intermediate node it is said to be two-hop away.

Connecting the nodes in the reflection set results in cycles ranging from (n+1)/2 if n is odd or n/2 if n is even up to n*(n+1)/2 when all nodes in the reflection set are connected to each other.

Throughout the present invention $N=n^2+n+1$, $n=p^r$ where p is prime $(2, 3, 5, 7, \ldots)$ and $r=1, 2, 3, \ldots$ N is therefore always odd. Throughout the specification all the arithmetic is modulo N.

BRIEF DESCRIPTION OF THE ACCOMPANYING DRAWING

Other aspects of the invention will become apparent by consideration of the accompanying drawing and their description stated below, which is merely illustrative of a preferred embodiment of the invention and does not limit in any way the nature and scope of the invention.

DETAILED DESCRIPTION

The present invention envisages a method for arranging nodes in a cluster computer network. The invention proposes a scheme for creation of a cluster having optimum number of connections and with a diameter of two, meaning any two nodes are at most two edges away from each other. The present invention uses Singer Difference Set for deriving networks with a smaller number of connections per node for clusters of the same size.

Further, the method envisaged by the present invention allows multiple computers to be placed at each node with the computers sharing the network in a non-conflicting manner, resulting in a powerful cluster at reduced cost.

In accordance with the present invention there is proposed a scheme of connecting N nodes where $N=n^2+n+1$ and $n=p^r$ with p being a prime number and $r=1, 2, 3, \ldots$ such that, each node connects to n+1 other nodes and the maximum distance between any two nodes is two hops.

A modification to the present invention is to have up to n+1 (or its multiples) computers at a node such that each of the computers access one of the n+1 edges conflict-free at any time. In case there are k*(n+1) computers at each node the k computers share an edge and k*(n+1) computers access n+1 edges.

A further modification to the present invention allows having m computers where m is an arbitrary number. In this case each edge is shared by at most m/(n+1)+1 computers.

A modification to the proposed scheme allows the present invention to construct (n+1)/2 cycles which retain the two hop connectivity, such that each node still connects to at most n+1 other nodes. A further modification to the proposed scheme allows addition of 'n' edges from each of the n+1 nodes giving rise to at least (n+1)*n/2 cycles. These nodes can be used to connect special units like large file servers, connections to external networks, memories, disks etc.

In accordance with the present invention, the present invention uses the principles of singer's difference set and improves the prior art techniques to arrive at a cluster of $N=n^2+n+1$ node with at most n+1 connection and with two hop connectivity. The principal point of the present invention is that the connections are symmetric.

The present invention defines a connection from a node i to node j by the following formula:

$$j=C-i+d_k$$

where, i and j are numbers from the Group $G=\{0, 1, 2, \ldots, N-1\}$ and C is a constant from the group G and $d_k$ is an element of the Difference Set $D=\{d_0, d_1, \ldots, d_k, \ldots, d_n\}$ where $N=n^2+n+1$.

In accordance with one aspect of the present invention, the connections of the cluster envisaged by the present invention are symmetric. This can be derived by considering a Group G of N numbers $\{0, 1, 2, \ldots, N-1\}$ and a Singer difference Set $D=\{d_0, d_1, \ldots, d_i, \ldots d_n\}$ of order n, where $N=n^2+n+1$. Then a connectivity scheme given by the formula: i is connected to $j=C-i+\{d_0, \ldots, d_1, \ldots, d_k, \ldots d_n\}$ where C is a constant between 0 and N−1 and $0<=i<=N-1$ is symmetric. In this scheme if node i is connected to j then j is connected to i.

Let i be connected to $j=C-i+d_k \ldots$ (1) For some k such that $0<=k<=n$.

Similarly j is connected to $C-j+d_k \ldots$ (2)

Substituting the first equation in the second equation, j is connected to $C-(C-i+d_k)+d_k =>$ j is connected to i is obtained. This implies that all connections are symmetric.

In accordance with another aspect of the present invention, the connection/edges between nodes of the proposed method has the following properties:

1. There is one self connection $i_k -> i_k$ when N is odd for connections corresponding to $d_k$. Let $j=C-i+d_k$ be a connection for some $i \in G=\{0, 1, \ldots N-1\}$. Let $i_k$ be a point such that $i_k=C-i_k+d_k$ then $2*i_k=C+d_k$. If $C+d_k$ is odd then $2*i_k$ mod $N==C+d_k+N$, or $i_k=(C+d_k+N)/2$. if $C+d_k$ is even the $i_k=(C+d_k)/2$. In both cases it is seen that $i_k \in G=\{0, 1, \ldots N-1\}$. Thus, there exists one self connection for $d_k$. This self connecting point $i_k$ is called a reflection point corresponding to difference set element $d_k$.

2. There are (N−1)/2 pairs of symmetric connections corresponding to each difference set element $d_k$ k=0, 1, ..., n and these connections connect point $i_k+d$ to point $i_k-d$ where $d=1, 2, \ldots (N-1)/2$ and $i_k$ is a reflection point corresponding to $d_k$. Let $i=i_k+d$ for $0<d<=(N-1)/2$, and the connection for i is given by the formula $C-i+d_k$. Combining the equations i is connected to $C-i_k-d+d_k$ is obtained. On rearranging, i is connected to $C-i_k+d_k-d$. Since $i_k$ is a reflection point, $i_k=C-i_k+d_k$ is substituted to get i is connected to $i_k-d$. Thus (N−1)/2 symmetric connections are obtained around the reflection point $i_k$ connecting $i_k+d$ to $i_k-d$ for $0<d<(N-1)/2$. It is useful to visualize all connections corresponding to $d_k$ as belonging to color k.

3. There are a maximum of n+1 connections to i corresponding to $d_k \in \{d_0, d_1, \ldots d_n\}$. Since each connection corresponding to $d_k$ is either a symmetric connection or a self connection, there will be at most one connection introduced by $d_k$ for k=0, 1, 2, ..., n. Thus, the maximum number of connections is n+1.

4. A two hop connection using edges corresponding to elements $d_j$ and $d_k$ of the difference set D={$d_0, d_1, \ldots, d_k, \ldots, d_n$} connects node i to i+($d_k-d_j$), where i ∈ {0, 1, 2, ..., N−1}. The two hop connection corresponding to elements $d_j$ and $d_k$ is C−(C−i+$d_j$)+$d_k$. On simplification i+$d_k$−$d_j$ is obtained. Thus, if data is transferred from node i on edge colored j and then along edge colored k it will reach node i+$d_k$−$d_j$.

5. The reflection point $i_j$ (corresponding to difference set element $d_j$) is connected to points $i_j$+($d_k-d_j$) for k≠j where $d_j$ and $d_k$ are elements of difference Set D={$d_0, d_1, \ldots, d_n$}. $i_j$ is connected to C−$i_j$+$d_k$ for k≠j and 0<=i, j<=n. Since $i_j$=C−$i_j$+$d_j$, Substituting it in the previous equation, $i_j$ is connected to C−(C−$i_j$+$d_j$)+$d_k$ is obtained. Simplifying the equation, $i_j$ is connected to $i_j$+$d_k$−$d_j$ for k≠j and 0<=k, j<=n.

6. Let $d_k$>$d_j$ and N is odd. If the greatest common divisor of ($d_k-d_j$) and N is f, then a circle with stride ($d_k-d_j$) has N/f=p points. The N points can further be divided into f circles of stride ($d_k-d_j$) and p points. Let N=f*p and ($d_k-d_j$)=f*q, where p and q are relative primes. Then (Least Common Multiple) LCM ($d_k-d_j$, N)=f*q*p. (From a theorem relating (Greatest Common Divisor) GCD and LCM of two numbers). Let C0={$C_{00}, C_{01}, \ldots C_{0p-1}$} be a set of p points at stride ($d_k-d_j$) with $C_{00}$ located at 0. Let $C_{0p}$ be a point at stride ($d_k-d_j$) from $C_{0p-1}$. Then $C_{0p}$ is located at a distance of p*f*q=q*N from $C_{00}$. This means $C_{0p}$=$C_{00}$. Thus, the points in set C0 comprise a circle of p points of stride ($d_k-d_j$). Similarly, all points at a distance of i from the set C0 comprise a circle where i=1, 2, ..., f−1. Thus, there are f circles of stride ($d_k-d_j$) with p points.

7. Consider a circle of p=N/f points of stride ($d_k-d_j$) where f is hcf(N, $d_k-d_j$). Let N be odd. If reflection point $i_j$ is a point on this circle, then reflection point $i_k$ is also a point on this circle. Also $i_k$ is at a distance of (p+1)/2*($d_k-d_j$) from $i_j$. The edges corresponding to $d_j$ connect points $C_i$ to $C_{p-i}$, and the edges corresponding to $d_k$ connect $C_{p-i}$ to $C_{i+1}$. The connection from $i_j$ to $i_k$ is a chain of p−1 edges. Consider a circle of p points $C_0, C_1, \ldots, C_{p-1}$ of stride ($d_k-d_j$), with $i_j$ being point $C_0$. From (1) the self connection is given by equation 2*$i_j$=C+$d_j$ and 2*$i_k$=C+$d_k$. On subtracting 2*($i_k-i_j$)=$d_k-d_j$. If, p=N, then $i_k$ is one of the points on this circle. If p<N then it can be assumed that $i_k$ is not one of the points on circle. The reflection point $i_j$ does not have an edge corresponding to $d_j$ and reflection point $i_k$ does not have an edge corresponding to $d_k$. All other points have edges corresponding to $d_k$ and $d_j$. From property 5 it can be derived that $i_j$ is connected by edge corresponding to $d_k$ to point $i_j$+($d_k-d_j$). This is point $C_1$ since it is ($d_k-d_j$) away from $C_0$. Consider an edge corresponding to $d_j$ from $C_1$. From 2 it is derived that this edge connects point $C_1$ at $i_j$+($d_k-d_j$) to a point at location $i_j$−($d_k-d_j$). This is point $C_{p-1}$. Consider an edge corresponding to $d_k$ from $C_{p-1}$. From property 2 it is derived that $C_{p-1}$ is connected to point C−$C_{p-1}$+$d_k$. Substituting for $C_{p-1}$ this equation becomes: C−($i_j$−($d_k-d_j$))+$d_k$=>C−$i_j$+2*($d_k-d_j$)+$d_j$=>$i_j$+2*($d_k-d_j$)=$C_2$. Pursuing this logic $C_2$ is connected to $C_{p-2}$, $C_{p-2}$ is connected to $C_3$ and so on. The p points composing the chain will thus be $C_0, C_1, C_{p-1}, C_2, C_{p-2}, \ldots, C_{(p-1)/2}, C_{(p+1)/2}$. Now, if $i_k$ is not one of the p points, $C_{(p+1)/2}$ is connected by edge corresponding to $d_k$ to some point. This point is C−($C_{(p+1)/2}$)+$d_k$. Substituting for $C_{(p+1)/2}$ C−($C_0$−(p−1)/2*($d_k-d_j$))+$d_k$ is obtained.

On simplifying C−$i_j$+(p−1)/2*($d_k-d_j$)+$d_k$=>$i_j$+(p+1)/2*($d_k-d_j$)=>$i_j$+(2*p−(p−1))/2*($d_k-d_j$)=>$i_j$−(p−1)/2*($d_k-d_j$)=>$C_{(p+1)/2}$ is achieved. This means $C_{(p+1)/2}$ is a self connection. This is a contradiction. So, $i_k$ is a point on the circle of stride ($d_k-d_j$). Further more from the above equations it can be concluded that this point is located at a distance of (p+1)/2*($d_k-d_j$) from $C_0$ ($i_j$). Further more this chain connects all points on the circle as outlined above.

Take any point $C_i$ i≠0 or (p+1)/2. Then the connection corresponding to $d_j$ connects $C_i$ to C−$C_i$+$d_j$=>C−($i_j$+i*($d_k-d_j$))+$d_j$=>C−$i_j$+$d_j$−i*($d_k-d_j$)=>$i_j$−i*($d_k-d_j$)==$C_{(p-i)}$.

Similarly the connection corresponding to $d_k$ connects $C_i$ to C−$C_i$+$d_k$=>C−($i_j$+i*($d_k-d_j$))+$d_k$=>C−$i_j$+$d_j$+($d_k-d_j$)−i*($d_k-d_j$)=>$i_j$−(i−1)*($d_k-d_j$)==$C_{(p-i+1)}$. From the above, the sequences start with $i_j$ and are composed of edges composed of $d_k$ and $d_j$ and ends at $i_k$. This sequence has p−1 edges; they begin from reflection point $i_j$ and ends in reflection point $i_k$. The first edge is of color k, and subsequent edges alternate between color j and color k. The last edge connecting reflection point $i_k$ is of color j.

Example: The concepts and properties of the cluster described above are now illustrated by an example for n=3 and C=0.

TABLE 6

Network connectivity for n = 3, 13 nodes.

| | CONNECTIONS 0 − I + {0, 1, 3, 9} COLOR | | | |
|---|---|---|---|---|
| | 0 | 1 | 2 | 3 |
| | DIFFERENCE SET ELEMENT | | | |
| NODE# | 0 | 1 | 3 | 9 |
| 0 | 0* | 1 | 3 | 9 |
| 1 | 12 | 0 | 2 | 8 |
| 2 | 11 | 12 | 1 | 7 |
| 3 | 10 | 11 | 0 | 6 |
| 4 | 9 | 10 | 12 | 5 |
| 5 | 8 | 9 | 11 | 4 |
| 6 | 7 | 8 | 10 | 3 |
| 7 | 6 | 7* | 9 | 2 |
| 8 | 5 | 6 | 8* | 1 |
| 9 | 4 | 5 | 7 | 0 |
| 10 | 3 | 4 | 6 | 12 |
| 11 | 2 | 3 | 5 | 11* |
| 12 | 1 | 2 | 4 | 10 |

*denotes self connections

TABLE 6 above gives a connection pattern for n=3, C=0, N=13. The difference set is {0, 1, 3, 9}. The connections are given by the formula 0−i+{0, 1, 3, 9} where i is between 0 and 12. The following can be observed:

1. The maximum number of connections is 4 in the present method in accordance with the present invention instead of 6 connections described in prior work.
2. There is symmetry in connectivity. Considering column 1 it is observed that node 1 is connected to 12 and node 12 is connected to 1. Similarly it can be verified that all connections are symmetric.

3. The distance between any two nodes is at most two. This can be verified by choosing any two rows and finding a common element. Examining the node 0, the first row shows that node 0 is connected by 1 hop connectivity to node {1, 3, 9}. Also, by symmetry it is seen that node 0 appears in rows 1 (color 1), 3 (color 2), and 9 (color 3). These nodes in rows 1, 3, and 9 are connected to 3 nodes other than 0. Thus, 0 is connected by 1 hop connectivity to 3 nodes and by 2 hop connectivity to the remaining 9 nodes. These are elaborated in TABLE 7 below. Thus, all 12 nodes are connected by either 1-hop or 2-hop connectivity.

TABLE 7

1 and 2-HOP connectivity pattern for node 0.

| | |
|---|---|
| 1-HOP | 0 -> {1, 3, 9} |
| 2-HOP | 0 -> 1 -> {2, 8, 12} |

TABLE 7-continued 1 and 2-HOP connectivity pattern for node 0.

| | |
|---|---|
| 2-HOP | 0 -> 3 -> {6, 10, 11} |
| 2-HOP | 0 -> 9 -> {4, 5, 7} |

4. Property 2 shows there are (N−1)/2 connections and one self connection corresponding to each difference element (color). Thus, simultaneous data exchange between (N−1)/2 pairs of nodes by using edges of one color is achieved. These are the connections corresponding to one color.
5. Property 4 gives the equations for two-hop data transfer on connections due to difference elements $d_j$ and $d_k$: $j \ne k$. The complete two hop data transfer based on this property for n=3 and N=13 is given in TABLE 8a below. It can be easily seen that for a particular pair $d_j$ and $d_k$ data gets transferred from node i to node $i+(d_k-d_j)$. Thus, using edges of color j and k data can be simultaneously transferred from all nodes to nodes that are $d_k-d_j$ apart.

TABLE 8a

Data transfer using edges corresponding to various difference elements.

| Edge Colors | 0, 1 | 1, 2 | 0, 2 | 3, 0 | 3, 1 | 2, 3 | 3, 2 | 1, 3 | 0, 3 | 2, 0 | 2, 1 | 1, 0 |
|---|---|---|---|---|---|---|---|---|---|---|---|---|
| Difference elements | 0, 1 | 1, 3 | 0, 3 | 9, 0 | 9, 1 | 3, 9 | 9, 3 | 1, 9 | 0, 9 | 3, 0 | 3, 1 | 1, 0 |
| Start Node | \multicolumn{12}{c}{End Nodes using 2 hop connections} | | | | | | | | | | | |
| 0 | 1 | 2 | 3 | 4 | 5 | 6 | 7 | 8 | 9 | 10 | 11 | 12 |
| 1 | 2 | 3 | 4 | 5 | 6 | 7 | 8 | 9 | 10 | 11 | 12 | 0 |
| 2 | 3 | 4 | 5 | 6 | 7 | 8 | 9 | 10 | 11 | 12 | 0 | 1 |
| 3 | 4 | 5 | 6 | 7 | 8 | 9 | 10 | 11 | 12 | 0 | 1 | 2 |
| 4 | 5 | 6 | 7 | 8 | 9 | 10 | 11 | 12 | 0 | 1 | 2 | 3 |
| 5 | 6 | 7 | 8 | 9 | 10 | 11 | 12 | 0 | 1 | 2 | 3 | 4 |
| 6 | 7 | 8 | 9 | 10 | 11 | 12 | 0 | 1 | 2 | 3 | 4 | 5 |
| 7 | 8 | 9 | 10 | 11 | 12 | 0 | 1 | 2 | 3 | 4 | 5 | 6 |
| 8 | 9 | 10 | 11 | 12 | 0 | 1 | 2 | 3 | 4 | 5 | 6 | 7 |
| 9 | 10 | 11 | 12 | 0 | 1 | 2 | 3 | 4 | 5 | 6 | 7 | 8 |
| 10 | 11 | 12 | 0 | 1 | 2 | 3 | 4 | 5 | 6 | 7 | 8 | 9 |
| 11 | 12 | 0 | 1 | 2 | 3 | 4 | 5 | 6 | 7 | 8 | 9 | 10 |
| 12 | 0 | 1 | 2 | 3 | 4 | 5 | 6 | 7 | 8 | 9 | 10 | 11 |

TABLE 8b

Node numbers of data at the current node due to Cumulative Exchanges using 5 steps and colors 0, 1, 2, 3, 0.

| | Step | | | | |
|---|---|---|---|---|---|
| | 0 | 1 | 2 | 3 | 4 |
| | | | Color | | |
| | 0 | 1 | 2 | 3 | 0 |
| | | | Difference Element | | |
| Node | 0 | 1 | 3 | 9 | 0 |
| 0 | 0 | 0, 1, 12 | 0, 1, 12, 3, 10, 11, 2 | 0, 1, 12, 3, 10, 11, 2, 9, 4, 5, 8, 7, 6 | 0, 1, 12, 3, 10, 11, 2, 9, 4, 5, 8, 7, 6 |
| 1 | 1, 12 | 1, 12, 0 | 1, 12, 0, 2, 11, 12 | 1, 12, 0, 2, 11, 12, 8, 5, 6, 7 | 1, 12, 0, 2, 11, 12, 8, 5, 6, 7, 3, 4, 9, 10 |
| 2 | 2, 11 | 2, 11, 12, 1 | 2, 11, 12, 1, 0 | 2, 11, 12, 1, 0, 7, 6, 9, 4, 5, 8 | 2, 11, 12, 1, 0, 7, 6, 9, 4, 5, 8, 3, 10 |
| 3 | 3, 10 | 3, 10, 11, 2 | 3, 10, 11, 2, 0, 1, 12 | 3, 10, 11, 2, 0, 1, 12, 6, 7, 8, 5, 4, 9 | 3, 10, 11, 2, 0, 1, 12, 6, 7, 8, 5, 4, 9 |
| 4 | 4, 9 | 4, 9, 10, 3 | 4, 9, 10, 3, 12, 1, 2, 11 | 4, 9, 10, 3, 12, 1, 2, 11, 5, 8 | 4, 9, 10, 3, 12, 1, 2, 11, 5, 8, 0, 6, 7, 11 |
| 5 | 5, 8 | 5, 8, 9, 4 | 5, 8, 9, 4, 11, 2, 3, 10 | 5, 8, 9, 4, 11, 2, 3, 10, 12, 1 | 5, 8, 9, 4, 11, 2, 3, 10, 12, 1, 0, 6, 7 |
| 6 | 6, 7 | 6, 7, 8, 5 | 6, 7, 8, 5, 10, 3, 4, 9 | 6, 7, 8, 5, 10, 3, 4, 9, 11, 2, 0, 1, 12 | 6, 7, 8, 5, 10, 3, 4, 9, 11, 2, 0, 1, 12 |
| 7 | 7, 6 | 7, 6 | 7, 6, 9, 4, 5, 8 | 7, 6, 9, 4, 5, 8, 2, 11, 12, 1, 0 | 7, 6, 9, 4, 5, 8, 2, 11, 12, 1, 0, 3, 10 |

TABLE 8b-continued

Node numbers of data at the current node due to Cumulative Exchanges using 5 steps and colors 0, 1, 2, 3, 0.

| | | | Step | | |
|---|---|---|---|---|---|
| | 0 | 1 | 2 | 3 | 4 |
| | | | | Color | |
| | 0 | 1 | 2 | 3 | 0 |
| | | | | Difference Element | |
| Node | 0 | 1 | 3 | 9 | 0 |
| 8 | 8, 5 | 8, 5, 6, 7 | 8, 5, 6, 7 | 8, 5, 6, 7, 1, 12, 0, 2, 11, 12 | 8, 5, 6, 7, 1, 12, 0, 2, 11, 12, 3, 4, 9, 10 |
| 9 | 9, 4 | 9, 4, 5, 8 | 9, 4, 5, 8, 7, 6 | 9, 4, 5, 8, 7, 6, 0, 1, 12, 3, 10, 11, 2 | 9, 4, 5, 8, 7, 6, 0, 1, 12, 3, 10, 11, 2 |
| 10 | 10, 3 | 10, 3, 4, 9 | 10, 3, 4, 9, 6, 7, 8, 5 | 10, 3, 4, 9, 6, 7, 8, 5, 12, 1, 2, 11 | 10, 3, 4, 9, 6, 7, 8, 5, 12, 1, 2, 11, 0 |
| 11 | 11, 2 | 11, 2, 3, 10 | 11, 2, 3, 10, 5, 8, 9, 4 | 11, 2, 3, 10, 5, 8, 9, 4 | 11, 2, 3, 10, 5, 8, 9, 4, 0, 1, 6, 7, 12 |
| 12 | 12, 1 | 12, 1, 2, 11 | 12, 1, 2, 11, 4, 9, 10, 3 | 12, 1, 2, 11, 4, 9, 10, 3, 6, 7, 8, 5 | 12, 1, 2, 11, 4, 9, 10, 3, 6, 7, 8, 5, 0 |

6. TABLE 8a shows how to transfer data from all nodes to all nodes by sequencing a set of simultaneous data transfers (node i=>node i+d where d=1, 2, . . . , N−1). Another way of transferring data from all nodes to all nodes by using n+2 cumulative exchanges is shown in TABLE 8b. Consider the connections in TABLE 6 corresponding to 4 colors. Perform data exchanges corresponding to color 0. Now each node except reflection node $i_0$ (which is node 0) will have data from itself and from the node connected to it by edge of color 0. The list of nodes from which data has been transferred in step 0 is shown in column 0. Next perform exchanges with nodes using edges of color 1. The list of nodes from which data has been transferred is given in column 1. Most nodes have data from 4 nodes (including itself). By continuing the exchanges using connections corresponding to different colors 2 and 3 some nodes exist which have data from all other nodes (like node 0) and others are incomplete. By performing one more data transfer from color 0 it is seen that all nodes have data from all other nodes. In summary data can be transferred by using cumulative exchanges corresponding to all colors and repeating an exchange with color 0 to fill all nodes with data from all other nodes.

7. Property 7 shows the existence of chains of p nodes and p−1 edges using edges corresponding to difference element $d_j$ and $d_k$. Here f is hcf($d_k$−$d_j$, N) and p=N/f. There are 6 chains connecting these reflection points for n=3 and N=13. Here f=1. These are obtained by starting at reflection point $i_j$ and alternatively choosing edges corresponding to $d_k$ and $d_j$ till you reach $i_k$. Thus on starting from node 0 and choosing edges corresponding to column 1 and column 0 a chain starting at 0 and terminating at 7 is obtained. The first edge is from column 1 and last edge is from column 0 and remaining edges alternate between column 1 and 0. These chains between all the reflection points are given in TABLE 9 below.

TABLE 9

6 chains corresponding between 4 reflection points for n = 3, N = 13.

| Number | Difference Set Element | Difference Set Element | Start Reflection Point | End Reflection Point | Chain |
|---|---|---|---|---|---|
| 1 | 0 | 1 | 0 | 7 | 0, 1, 12, 2, 11, 3, 10, 4, 9, 5, 8, 6, 7 |
| 2 | 0 | 3 | 0 | 8 | 0, 3, 10, 6, 7, 9, 4, 12, 1, 2, 11, 5, 8 |
| 3 | 0 | 9 | 0 | 11 | 0, 9, 4, 5, 8, 1, 12, 10, 3, 6, 7, 2, 11 |
| 4 | 1 | 3 | 7 | 8 | 7, 9, 5, 11, 3, 0, 1, 2, 12, 4, 10, 6, 8 |
| 5 | 1 | 9 | 7 | 11 | 7, 2, 12, 10, 4, 5, 9, 0, 1, 8, 6, 3, 11 |
| 6 | 3 | 9 | 8 | 11 | 8, 1, 2, 7, 9, 0, 3, 6, 10, 12, 4, 5, 11 |

The previous description elaborates on the mathematics and the associated properties of the cluster based on the scheme proposed by the present invention.

In accordance with yet another aspect of the present invention, by following the proposed method the cluster can be built by connecting computer nodes to a 1×(n+1) switch. The n+1 ports of the switch are connected according to the formula i connects to j defined by the formula j=C−i+$d_k$ where $d_k \in D$, where i, j $\in$ G={0, 1, 2, . . . , N} and C is a constant $\in$ G. Without loss of generality C can be set to 0. Then the connections are defined by j=$d_k$−i, where $d_k \in D$, where i, $\in$ G={0, 1, 2, . . . , N}. The switches allow bidirectional data transfer between the computer nodes and are connected on single port side to a computer. The n+1 ports are in turn connected to switches at other nodes in accordance with the present invention.

Alternatively, the cluster can also be built using an n+2 ports all connect switch. In this case, one switch is connected to each of the N computers. The remaining n+1 ports connect according to the formula j=$d_k$−i proposed by the present invention. This allows data transfer between nodes that are two-hop away directly through the intermediate switch (without the data being transferred to the intermediate computer).

Figure 1:
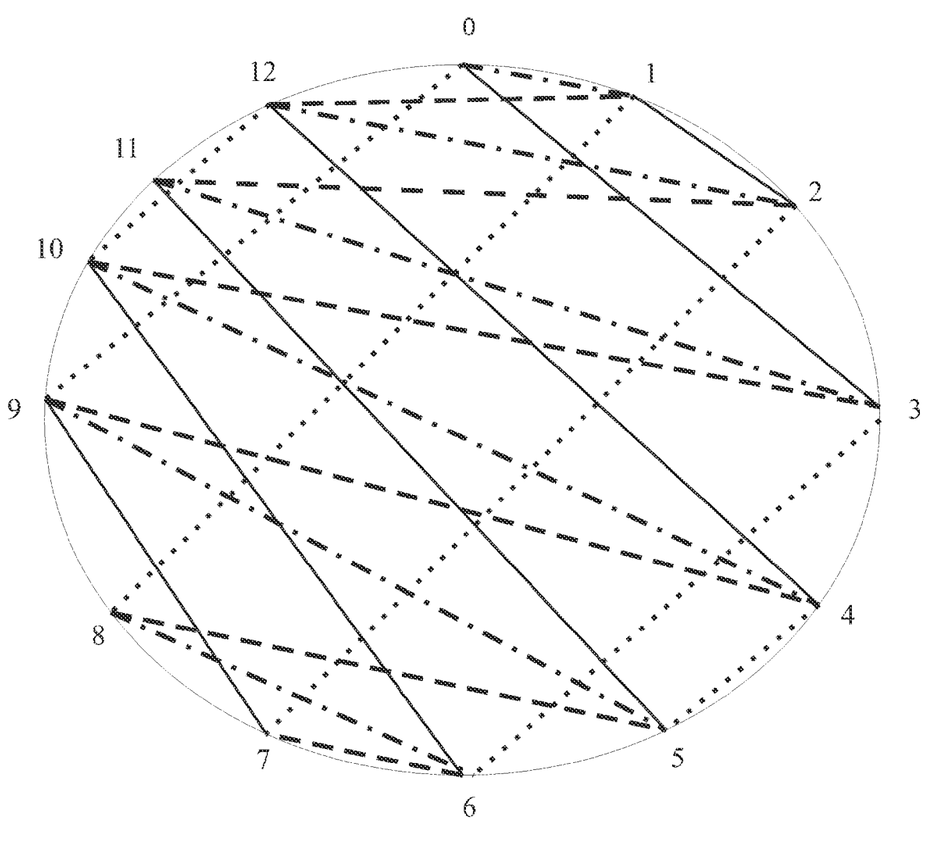
FIG. 1 illustrates the connections proposed by the present invention for n=3, N=13.

FIG. 1 shows the connection of a cluster of computers for n=3 and N=13 in accordance with the present invention. If an all connect switch is used then the data transfer between 0 and 2 will happen in 2 hops in the following manner, Computer 0->Switch0->Switch 1->Switch 2->Computer 2.

TABLE 6 gave the four connections from each of the 13 nodes. FIG. 1 shows the connections corresponding to TABLE 6 in a pictorial form. The 'dashed line' edges correspond to difference element 0 (Color 0), the 'dot-dashed line' edges correspond to difference element 1 (Color 1), 'solid line' edges correspond to difference element 3 (Color 2) and 'dotted line' edges correspond to difference element 9 (Color 3).

TABLE 8 gave data transfer patterns using edges of different colors corresponding to different difference set elements. This can be seen pictorially in FIG. 1. Thus, a 'dot-dashed' line and a 'dotted line' edge (corresponding to difference element 1 and 9) connects node i to node i+(9−1)=i+8. Similarly, various combinations connect a node i to the remaining N−1 nodes.

In accordance with the present invention, consider a network of N nodes where $N=n^2+n+1$. Each node has n+1 links. Since there is only one computer per node, at any given time only one of the links is active. TABLE 8 shows a network which supports permutation of stride d for d=1, 2, ..., N−1 where $N-1=n^2+n$ in accordance with the present invention. Instead of all-to-all switch with n+2 ports and one computer node per switch, connect m computers per node using a m+n+1 all connect switch, where m=1, 2, ..., n+1.

Of particular importance is placing m=n+1 computers at each node. This can advantageously use the network proposed by the present invention as it has n+1 links at each node, with each computer sending/receiving data on a separate link.

In accordance with still another aspect of the present invention, consider a network of $N=n^2+n+1$ nodes. Let each node have n+1 computers and denote the computers in this network by the tuple (i, j) where i=0, 1, 2, ..., N−1 and j=0, 1, 2, ..., n, such that $N=n^2+n+1$. It takes n sequences to transfer data from the n+1 computers at all N nodes to one of the n+1 computers of the remaining $N-1=(n^2+n)$ nodes.

Each node has n+1 computers and n+1 links. Let us use the notation (i, j) to denote computer j at node i, where i=0, 1, ...N−1 and j=0, 1, ...n. Then the data transfer is performed according to the formula $(i+d_k-d_j, k) <= (i, j)$ where k≠j and k=0, 1, 2, ...n. Thus, a computer j at node i transfers its data to n other computers. Since there are n+1 computers at a node there are a total of n*(n+1) data transfers. There are a maximum of n+1 links. So the transfers will be sequenced into n steps. Let k=(j+s) mod(n+1), where s=1, 2, 3, ..., n. This ensures that j≠k. There are in all $(n+1)*n=n^2+n$ nodes to which data needs to be transferred. Each step transfers data between a bank of n+1 computers at node i (denoted by j=0, 1, 2, ... n) to the bank of computers k at node $(i+d_k-d_j)$ mod(N) (denoted by k=(j+s)mod(n+1)) ... (3) The example below illustrates this for n=3 and N=13.

TABLE 10

Data transfer between N = 13 nodes with 4 computers per node, in a sequence of 3 steps.

| | s | | |
|---|---|---|---|
| j | 1 | 2 | 3 |
| (i, 0)=> | (i + 1, 1) | (i + 3, 2) | (i + 9, 3) |
| (i, 1)=> | (i + 2, 2) | (i + 8, 3) | (i + 12, 0) |
| (i, 2)=> | (i + 6, 3) | (i + 10, 0) | (i + 11, 1) |
| (i, 3)=> | (i + 4, 0) | (i + 5, 1) | (i + 7, 2) |

The entries in the table are $((i + d_k - d_j) \mod N, (j + s) \mod(n + 1))$.

Consider a network of n=3, N=13. The difference set is {0, 1, 3, 9}. TABLE 8 gives the 12 sequences of permutations for transferring data between the 13 nodes. Let each node have 4 computers and be connected by an 8 by 8 switch. Then according to (3) the data can be transferred in 3 sequences. TABLE 10 above shows the sequence of 3 steps for transferring the data between 13 nodes with each node having a bank of 4 computers.

In accordance with a further aspect of the present invention, the proposed scheme supports connections corresponding to the following permutations. The first two permutations do not share an edge and hence can be called conflict-free. The third permutation share an edge for all sends and hence it is balanced. In effect, this means that half the bandwidth for communication is used by these permutations.

TABLE 11

Permutations supported by the network proposed by the present invention.

| Sr. No | Type of Permutation | Formula | Characteristic | Number of Permutations | Bi-direction | Number of edges |
|---|---|---|---|---|---|---|
| 1 | Reflection around Reflection point $i_k$ | $j = C - i + d_k$<br>$i = C - j + d_k$<br>$i, j = 0, 1, ..., N - 1$<br>$N = n^2 + n + 1$ | $2 * i_k = C + d_k$ | n + 1.<br>For k = 0, 1, ..., n | Yes<br>No sharing of edge | 1 |
| 2 | Shift all by stride d = $d_k - d_l$ | $j = i + d_k - d_l$<br>$i = 0, 1, ... N - 1$ | | (n + 1) * n<br>For k, l = 0, 1, ..., n<br>and k ≠ l | Yes<br>No sharing of edge | 2 |
| 3 | Exchange data between nodes that are stride d apart. | $j = i + d_k - d_l$<br>$i = j + d_l - d_k$<br>$i, j = 0, 1, ... N - 1$ | | 2 * (n + 1) * n<br>For k, l = 0, 1, ..., n<br>and k ≠ l | Yes<br>There is sharing of each edge by 2 sends | 2 |
| 4 | Exchange with nodes that are two hop apart along a chain | chain(i, k) is the $k^{th}$ node on $i^{th}$ chain.<br>Exchange with chain(i,(k + 2)mod N) | | (N % 4) * (n + 1) * n/2 | Yes<br>No sharing of edge | 2 |

In accordance with the present invention, the two hops using edges corresponding to $d_j$ and $d_k$ for $j \neq k$ and $j, k=0, 1, n$ will transfer data from node i to the remaining $n^2+n$ nodes. Particularly, data will be transferred from i to $i+d_j-d_k$. This is in effect a permutation of stride $d_j-d_k$ for $j \neq k$ and $j, k=0, 1, \ldots n$.

In addition there are n+1 permutations corresponding to using single hop reflected connectivity given by data being transferred from node i to node $C-i+d_j$ for some fixed C and $0<=j<=n$.

The network connectivity proposed by the present invention retains the two-hop connectivity and at the same time requires at most only n+1 connection per node for $n^2+n+1$ node cluster. The invention allows transfer of data from all nodes by a stride of j for $j=1, 2, \ldots, N-1$. The utility of a network topology is dependent on the number of non-conflicting permutations supported by the network. It is seen that the current network has n+1 nodes (at reflection points) with only n external connections. These form the end points of $(n+1)*n$ chains. It is possible to add edges between these nodes and convert the chain to a cycle. The benefit is the network now has cycles which can be used as a non-conflicting permutation for transferring data. Thus, a modification is proposed which will result in:

All nodes having n+1 connections; and
All nodes having (n+1)/2 distinct cycles.

The existence of chains between reflection points and the procedure to construct them was shown in property 7. TABLE 9 gives the six chains of length 12 for n=3 and N=13. The reflection points are 0, 7, 8 and 11. These nodes have n external connections and 1 self connection. The chains can be converted to cycles by connecting 7 to 0 and 11 to 8. Now, all the nodes will have n+1 external connection and two physically connected full (of length N) cycles can be achieved.

TABLE 12A

Connections represented in four columns (colors),
*represents connections replacing self-loops.

| NODE# | COLOR 0 ( ) $D_I = 0$ | COLOR 1 ($D_I = 1$) | COLOR 2 ($D_I = 3$) | COLOR 3 ($D_I = 9$) |
|---|---|---|---|---|
| 0 | 7* | 1 | 3 | 9 |
| 1 | 12 | 0 | 2 | 8 |
| 2 | 11 | 12 | 1 | 7 |

TABLE 12A-continued

Connections represented in four columns (colors),
*represents connections replacing self-loops.

| NODE# | COLOR 0 ( ) $D_I = 0$ | COLOR 1 ($D_I = 1$) | COLOR 2 ($D_I = 3$) | COLOR 3 ($D_I = 9$) |
|---|---|---|---|---|
| 3 | 10 | 11 | 0 | 6 |
| 4 | 9 | 10 | 12 | 5 |
| 5 | 8 | 9 | 11 | 4 |
| 6 | 7 | 8 | 10 | 3 |
| 7 | 6 | 0* | 9 | 2 |
| 8 | 5 | 6 | 11* | 1 |
| 9 | 4 | 5 | 7 | 0 |
| 10 | 3 | 4 | 6 | 12 |
| 11 | 2 | 3 | 5 | 8* |
| 12 | 1 | 2 | 4 | 10 |

TABLE 12B

Two 2-color cycles connecting 13 nodes.

| CYCLE 0 (COLOR 0 & 1) | 0 | 1 | 12 | 2 | 11 | 3 | 10 | 4 | 9 | 5 | 8 | 6 | 7 |
|---|---|---|---|---|---|---|---|---|---|---|---|---|---|
| CYCLE 1 (COLOR 2 & 3) | 8 | 1 | 2 | 7 | 9 | 0 | 3 | 6 | 10 | 12 | 4 | 5 | 11 |

Cycle 0 uses colors 0 and 1, Cycle 1 uses colors 2 and 3.

For n=3, N=13 there are 6 chains (4*3/2) with 4 points (0, 7, 8, 11) as start and end points. All the chains are of length 13. Two chains are to be picked such that the start and end points of the two chains do not intersect. For instance, if chain #1 is picked starting at 0 and ending at 7 and chain #6 starting at 8 and ending at 11, the circle can be completed by connecting 7 to 0 and 11 to 8. This increases the number of connections at 0, 7, 8, and 11 to 4. The benefit of adding the extra edge is that additional two full cycle permutations are now available. TABLE 12A shows the modified connections and TABLE 12B shows the two full cycles.

Furthermore, Property 7 has shown that if the hcf($d_k-d_j$, N)=f, where f>1, then the number of points on the chain will be p=N/f. For n=7 and N=57 there are 28 chains. TABLE 13A shows the stride ($d_k-d_j$). The number in parenthesis is f when f>1. TABLE 13B shows the number of nodes in the chain from $i_j$ to $i_k$. The four selected pairs to give chains and cycles of length 57 are marked as selected.

TABLE 13A

Difference stride when combining 2 columns, $d_k$ is shown has column heading, and $d_j$ is shown as row heading.

| DIFFSET ELEMENTS | 0 | 1 | 3 | 13 | 32 | 36 | 43 | 52 |
|---|---|---|---|---|---|---|---|---|
| 0 | 0 | 1 | 3 (3) | 13 | 32 | 36 (3) | 43 | 52 |
| 1 | 56 | 0 | 2 | 12 (3) | 31 | 35 | 42 (3) | 51 (3) |
| 3 | 54 (3) | 55 | 0 | 10 | 29 | 33 (3) | 40 | 49 |
| 13 | 44 | 45 (3) | 47 | 0 | 19 (19) | 23 | 30 (3) | 39 (3) |
| 32 | 25 | 26 | 28 | 38 (19) | 0 | 4 | 11 | 20 |
| 36 | 21 (3) | 22 | 24 (3) | 34 | 53 | 0 | 7 | 16 |
| 43 | 14 | 15 (3) | 17 | 27 (3) | 46 | 50 | 0 | 9 (3) |
| 52 | 5 | 6 (3) | 8 | 18 (3) | 37 | 41 | 48 (3) | 0 |

HCF is in parenthesis when greater than 1.

TABLE 13B

Cycle length when not a full cycle.

| DIFFSET ELEMENTS | 0 | 1 | 3 | 13 | 32 | 36 | 43 | 52 |
|---|---|---|---|---|---|---|---|---|
| 0 | 0 | | 19 | | 19 | | | |
| 1 | | 0 | | 19 | | | 19 | 19 |
| 3 | 19 | | 0 | | | 19 | | |
| 13 | | 19 | | 0 | 3 | | 19 | 19 |
| 32 | | Select | | 3 | 0 | | | |
| 36 | 19 | | 19 | | Select | 0 | | |
| 43 | | 19 | | Select | 19 | | 0 | 19 |
| 52 | | Select | 19 | | 19 | | 19 | 0 |

The pairs to select to get 4 full cycles are marked by word select. They are (52, 0), (32, 1), (43, 3), (36, 13).

In accordance with the present invention, there is provided a method for creating (n+1)/2 cycles as given below:
1. Let $D=\{d_0, d_1, \ldots d_n\}$ be the difference set of size n+1 on a group G of size $N=n^2+n+1$.
2. Mark column pairs that cannot be combined to give full cycles. A column pair k and l cannot be combined for k=0, 1, ..., n and l=k+1, ..., n. If hcf($d_l - d_k$, N)>1.
3. Create (n+1)/2 column pairs such that each pair gives a full cycle. These pairs are selected by a straightforward depth first search through all column pair combinations. Create a chain between these column pairs as outlined in property 7. Add edges to connect these (n+1)/2 column pairs to complete the cycle.

In accordance with the present invention, the network supports all permutations mentioned in TABLE 11. In addition, (n+1)/2 chains are converted to full cycles by adding (n+1)/2 edges. This allows the following additional permutations: (i) Rotate clockwise and anticlockwise by 1 along each circle, (ii) Rotate clockwise by 1 on one circle and rotate clockwise by 1 on the same or different circle, (iii) Rotate anticlockwise by 1 on one circle and rotate anticlockwise by 1 on the same or different circle, (iv) Rotate clockwise by 1 on one circle and rotate anticlockwise by 1 along a different circle, and (v) Rotate anticlockwise by 1 on one circle and rotate clockwise by 1 along a different circle.

In accordance with the present invention, the network proposed by the present invention can be changed by adding edges so that all nodes have n+1 edges and (n+1)/2 full physical cycles can be achieved. The upper limit of n+1 connections per node can be relaxed for the special n+1 nodes that are the reflection points. More connections can be added to these special nodes to get more cycles. When all (n+1) reflection points are connected amongst themselves a potential of (n+1)*n/2 cycles are obtained. Some of them may be of smaller circumference, if, the hcf of the stride ($d_k - d_j$) and N is >1. These special nodes having extra connections help in increasing the reliability of the cluster. Also, these special nodes can be used as special powerful nodes by adding more blades, using a more powerful computer. Alternatively they can be used as file server points. This network supports all permutations supported by the network with (n+1)/2 full cycles.

In accordance with the present invention, multiple computers at each of the node of the network can be connected. This includes the variations with (n+1)/2 cycles and one with up to (n+1)*n/2 cycles.

Furthermore, if two computers access data from the same node then the bandwidth is reduced due to memory contention. Therefore one of the steps in reducing communication costs is to decompose the data communication sequences into non-conflicting sequence. A non-conflicting communication sequence is a sequence of non-conflicting data access patterns, also known as perfect access pattern. A perfect access pattern for n nodes is any permutation pattern of n nodes. The communication links are bidirectional, which means if there is a link between node i and node j, data can be transferred from i to j and j to i simultaneously. All the permutations listed for the various networks described up till now give rise to a perfect access pattern. These patterns of communication can be used to sequence the communication between the nodes of the cluster to get high bandwidth due to these patterns being non-conflict access patterns.

The method and the modification proposed by the present invention form the perfect access pattern. This pattern allows all the computers to access data simultaneously from non-local memories without conflict. This ensures the fastest access of data. Every node has n+1 connections. With the perfect access patterns proposed by the present invention at any given time only one out of the n+1 connections is used. This invention proposes to populate each node with n+1 computers and connect it in one of the following ways:
  Each node is connected to an n+1 by n+1 bipartite switch. This enables each of the n+1 computers to simultaneously communicate with one of the n+1 computers through the bipartite switch.
  In addition to the above bipartite switch each computer at a node is connected to the remaining n computers at the node in a variety of ways:
    All connect,
    Tree network
    Ring network.
  These connections allow the super node (of n+1 computers at a node) to communicate data between its computers.
  Each node with n+1 computers is connected to a 2*n+2 all connect switch. This enables n+1 computers to:
    communicate amongst themselves;
    communicate with n+1 external computers (using 1-HOP connections); and
    communicate with the remaining external computers using 2-HOP connections.

TECHNICAL ADVANTAGES

The technical advancements of the present invention include:
  providing a cost effective clustered computer network;
  providing a method and a structure for a cluster for connecting processing units and memories for increased computational capability;
  providing a method for designing chips and boards and other apparatus comprising computational units, communication units and memory units for faster solving of problems;
  providing a method for creating a cluster which has two-hop connectivity and symmetry amongst the nodes of the cluster;
  providing a method and a structure for a cluster where all nodes have n+1 connections;
  providing a method and a structure where all nodes in a cluster belong to (n+1)/2 distinct full cycles;
  providing a method and a structure where all nodes in a cluster belong to at least n*(n+1)/2 distinct full cycles;
  providing a method and a structure where (n+1) edges can be added to each node; and
  providing a method and a structure for non-conflict data access to a plurality of nodes in a cluster network.

The invention claimed is:
1. A method for arranging a plurality of nodes in a cluster, said method comprising the following steps:
  quantifying the number of nodes in the cluster 'N' by computing the summation of N using the formula $N=n^2+n+1$, where $n=p^r$ and p is a prime number and r is a positive integer other than zero;
  assigning sequentially unique positive integers to each of said nodes of said cluster 'N' between 0, 1, ... N−1;

selecting a Singer Difference set 'D' comprising n+1 elements forming the set $D=\{d_o, d_1, \ldots, d_k, \ldots, d_n\}$ where k is a positive integer having values from $0, 1, \ldots n+1$; and the number $d_k$ are one of the above mentioned positive integers between 0 to N−1; and connecting each node i of said cluster to at most n+1 other nodes satisfying the formula $j=(C-i+d_k) \mod N$ where $d_k$ is an element of the said Singer difference set and i, j are positive integers having values in the range of $0, 1, 2, \ldots, N-1$ and C being a fixed constant for a particular network and having values in the range of $0, 1, 2, \ldots, N-1$.

2. A method as claimed in claim 1, wherein said connections between the nodes of the cluster are symmetrically connected maintaining maximum number of edges between any two nodes as 2.

3. A method as claimed in claim 1, wherein the step of connecting said node comprises detecting R reflection nodes, where $R=\{r_o, r_i, \ldots r_n\}$ such that node i is a reflection node if there exists one difference element $d_j$ from the Singer difference set, such that the formula $C-i+d_j=i$ is satisfied and yields a self connection.

4. A method as claimed in claim 1, wherein the step of connecting the nodes includes the step of checking if n+1 is even and further includes the step of selecting disjoint (n+1)/2 pairs of nodes from the set R and connecting them to create (n+1)/2 cycles in said cluster.

5. A method as claimed in claim 1, wherein the step of connecting the nodes includes the step of checking if n+1 is odd and further includes the step of selecting n/2 pairs of nodes from the set R and connecting them to create n/2 cycles in said cluster.

6. A method as claimed in claim 1, wherein the step of connecting said node comprises detecting R reflection nodes, where $R=\{r_o, r_i, \ldots r_n\}$ such that node i is a reflection node if there exists one difference element $d_j$ from the Singer difference set, such that the formula $C-i+d_j=i$ is satisfied and yields a self connection and the nodes $r_j$ from set R create $n*(n+1)/2$ cycles in said cluster.

7. A method as claimed in claim 1, wherein said method comprises the step of transferring data from one node to all other nodes by performing simultaneous exchanges corresponding to edges of colors k, $(k+1)\mod(n+1), \ldots, (k+n+1)\mod(n+1)$ where k is a number in the range $0, 1, 2, \ldots, n$, wherein said step further includes using the permutations of cycles for transferring data simultaneously between nodes.

8. A method as claimed in claim 1, wherein said method comprises the step of connecting the nodes using an 1×(n+1) all connect bidirectional switch to allow two hop connections to directly connect two nodes and perform data transfer using only an intermediate switch.

9. A method as claimed in claim 1, wherein said method comprises the step of communicating data simultaneously between node i and node i+d where $d=1, 2, \ldots, N-1$.

10. A method as claimed in claim 1, wherein said method comprises the step of sequencing communication when there are n+1 computers such that each of the n+1 computers at every node use a different link resulting in an optimum utilization of the network and an increase in throughput of the network.

11. A method for arranging a plurality of nodes in a cluster, said method comprising the following steps:

quantifying the number of nodes in the cluster 'N' by computing the summation of N using the formula $N=n^2+n+1$, where $n=p^r$ and p is a prime number and r is a positive integer other than zero;

assigning sequentially unique positive integers to each of said nodes of said cluster 'N' between $0, 1, \ldots N-1$;

selecting a Singer Difference set 'D' comprising n+1 elements forming the set $D=\{d_o, d_1, \ldots, d_k, \ldots, d_n\}$ where k is a positive integer having values from $0, 1, \ldots n+1$; and the number $d_k$ are one of the above mentioned positive integers between 0 to N−1;

connecting each node i of said cluster to at most n+1 other nodes satisfying the formula $j=(C-i+d_k) \mod N$ where $d_k$ is an element of the said Singer difference set and i, j are positive integers numbers which can have values in the range of $0, 1, 2, \ldots, N-1$ and C is a fixed constant for a particular network and has values in the range of $0, 1, 2, \ldots, N-1$; and populating m computers at each node and further using an m+n+1 all connect switch to create a cluster, where m>1.

12. A method as claimed in claim 11, wherein the m computers are further connected by a separate m×m all-connect switch.

13. A method as claimed in claim 11, wherein the m computers are further connected in a fat tree network.

14. A method as claimed in claim 11, wherein the m computers are further connected in a ring network.

15. A method as claimed in claim 11, wherein said m computers are further connected in an all-connect network.

16. A method as claimed in claim 11, wherein at least one node has an additional external access device, typically said additional external access device being a file server which can be connected through an (m+1) all connect switch.

17. A method as claimed in claim 11, wherein at least one node has an additional external communicating switch which can be connected through an (m+1) all connect switch.

18. A method as claimed in claim 1, wherein said step of connecting nodes comprising processors and memories includes the following steps:

connecting N processor nodes between $0, 1, \ldots, N-1$ and N memory nodes between $0, 1, \ldots, N-1$ to an 1×(n+1) switch; and connecting processor i to memory j where $j=C-i+d_k$ where i, j is in the range of $0, 1, \ldots, N-1$, and C is constant for the network in the range $0, 1, \ldots, N-1$ and $d_k$ is difference set element for difference Set $D=\{d_o, d_1, \ldots, d_k, \ldots, d_n\}$ for the Group $G=\{O, 1, \ldots, N-1\}$.

19. A method as claimed in claim 1, wherein said step of connecting nodes includes the step of connecting m computers to an m×(n+1) switch and the m memories to an m×(n+1) switch wherein the transferring of data takes place by connecting m computers at node i to m memories at node j where $j=C-i+d_k$.

20. A method as claimed in claim 1, wherein said transferring of data takes place by connecting m computers at node i to m memories at node j where $j=C-i+d_k$ where i,j is in the range of $0, 1, \ldots, N-1$, C is constant for the network in the range $0, 1, \ldots, N-1$, die is difference set element for difference Set $D=\{d_o, d_1, \ldots, d_k, \ldots, d_n\}$ for the Group $G=\{0, 1, \ldots, N-1)$, and m is in the range of $1, 2, \ldots, n+1$.

* * * * *

UNITED STATES PATENT AND TRADEMARK OFFICE
CERTIFICATE OF CORRECTION

PATENT NO. : 8,316,121 B2
APPLICATION NO. : 13/045745
DATED : November 20, 2012
INVENTOR(S) : Dhananjay Brahme It is certified that error appears in the above-identified patent and that said Letters Patent is hereby corrected as shown below:

In column 1, line 34, Delete "and or" and insert -- and/or --, therefor.

In column 8, line 52, Delete "if" and insert -- If --, therefor.

In column 10, line 19, Delete "$(d_k-d_i)$" and insert -- $(d_k-d_j)$ --, therefor.

In column 14, line 55, After "i," insert -- j --.

In column 16, line 9, After "(3)" insert -- . --.

In column 22, line 15, In Claim 11, delete "integers" and insert -- integer --, therefor.

In column 22, line 47, In Claim 18, delete "G={O," and insert -- G={0, --, therefor.

Signed and Sealed this
Fifth Day of March, 2013

Teresa Stanek Rea
*Acting Director of the United States Patent and Trademark Office*